Jan. 12, 1954
C. H. GLEASON
2,666,157
RADIATION DETECTOR
Filed Nov. 30, 1951
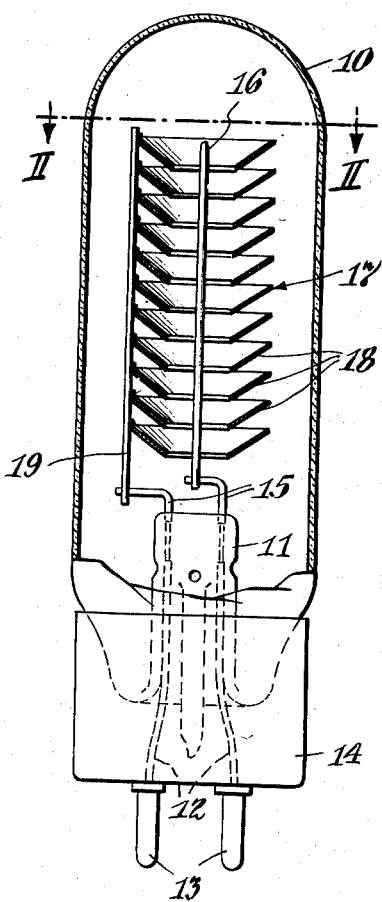
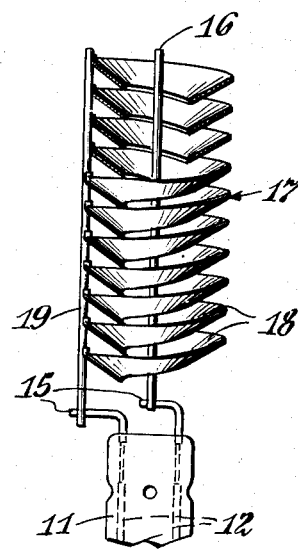
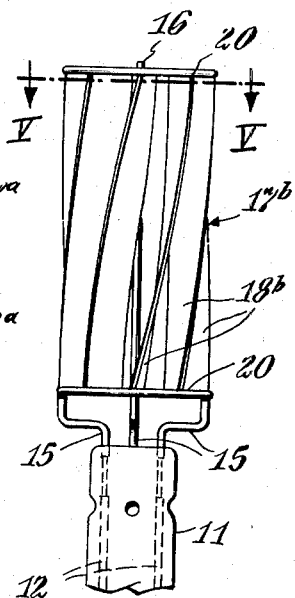
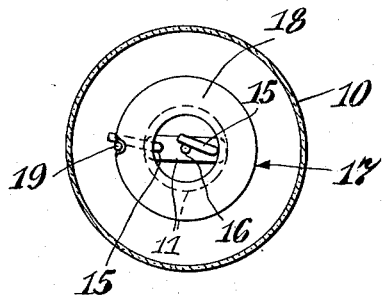
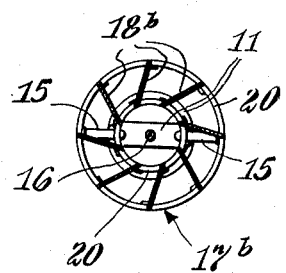
INVENTOR
C. H. GLEASON.
BY
ATTORNEY Patented Jan. 12, 1954

2,666,157

UNITED STATES PATENT OFFICE 2,666,157

RADIATION DETECTOR

Charles Herbert Gleason, Bloomfield, N. J., assignor to Westinghouse Electric Corporation, East Pittsburgh, Pa., a corporation of Pennsylvania Application November 30, 1951, Serial No. 259,043

2 Claims. (Cl. 313—93)

This invention relates to radiation detectors and is particularly concerned with the photosensitive radiation detectors, such as Geiger tubes and photo-tubes, which must be capable of receiving the radiation to be detected over a wide receiving angle and must intercept and use that radiation in an efficient manner.

An object of the invention is to increase the sensitivity and efficiency of a radiation detector.

Another object is to enlarge the receiving angle of the radiation detector.

A further object is to assure impingement on the cathode of radiation entering the tube at all angles of usual approach.

Yet another object of the invention is to provide for short paths in an effective field for photons from point of derivation from the cathode in travel to the anode.

Additional objects of the invention are to provide a construction readily manufactured, of adequate ruggedness and yet presenting an extensive cathode surface within a small volume enclosure.

Other objects of the invention will appear to those skilled in the art to which it appertains as the description proceeds, both by direct recitation thereof and by implication from the context.

Referring to the accompanying drawing, in which like numerals of reference indicate similar parts throughout the several views:

Fig. 1 is an elevational section of a detector constructed in accordance with the present invention;

Fig. 2 is a cross-section on line II—II of Fig. 1;

Fig. 3 is an elevation of the electrode assembly with a modified construction of cathode for my improved radiation detector;

Fig. 4 is an elevation of another electrode assembly showing yet another modification of cathode; and Fig. 5 is a cross-section on line V—V of Fig. 4.

In the specific embodiment of the invention illustrated in said drawing, an elongated or other suitable envelope 10 is shown having a reentrant stem 11 and lead-in connections 12 from prongs 13 on a base 14. The envelope is evacuated and in that condition is appropriate for photocell use, or may be charged with an appropriate gas, such as neon, argon or equivalent within a pressure range of ten millimeters to atmospheric, and thereafter sealed, and in the condition is appropriate for use in the general manner of Geiger-Mueller type detectors. Said envelope is of a material suitable for transmission of the type of radiation to be detected, and for broad range electro-magnetic radiation a suitable example. Some other types of radiation such as alpha, beta and gamma require envelopes of suitable transmission properties therefor, of which mica, aluminum, and beryllium have been found acceptable.

Proper metallic supports 15 are mounted in the stem on which to mount the electrodes and to make electrical connection therefrom to the lead-in connections 12. In all forms illustrated, the anode 16, constituting one of said electrodes, is carried by one of said supports and extends coaxially within the envelope. The anode may be a wire of any acceptable metal, such as nickel, tungsten, molybdenum and the like.

A cathode comprises the other electrode for the detector, and is variously shown and identified in Figs. 1 and 2 as cathode 17, in Fig. 3 as cathode 17a and in Figs. 4 and 5 as cathode 17b. The over-all configuration of each of these cathodes is cylindrical and hollow and it is located in each instance around and coaxial with the anode, and electrically separated therefrom. For purpose of rigidity, the cathode is preferably constructed with a body of suitable sheet metal, such as nickel, tungsten, molybdenum and the like, and is coated all over with a photo surface selected from known materials for the purpose and appropriate to the wavelength of radiation to be detected. One excellent material is a combination of layers, namely, cesium on oxygen on silver. Other materials are the alkali earth metals, such as lithium, sodium, potassium and cesium.

An important desideratum for a detector of this character is to provide as extensive a surface as possible for the reception of radiation thereto from an exterior source. In the absence of any other consideration, a solid cylindrical cathode of large diameter would be ideal, but a second requirement is imposed, namely, that the cathode surface receiving such radiation shall be in an electric field between that surface and the anode by which photoelectrons released from the cathode will be impelled to the anode. Consequently, with a solid cylindrical cathode, where the anode is located inside thereof, photoelectrons released from the outside surface of the cathode would be in a substantially field-free space. While perforating the cathode would overcome this latter objection to some degree, the perforations would introduce the drawbacks of reducing the cathode area and of providing many direct-line paths for the radiation to pass entirely through the cathode without impinging upon either the outside or the inside surfaces thereof.

To obtain maximum radiation interception and to locate all areas of such interception in the effective range of the accelerating field, I have devised a geometry of cathode constituting the essential objective of the present invention, and have arbitrarily selected a limited few exemplifications for illustration of the inventive concept.

Referring specifically to Figs. 1 and 2, the cathode 17 shown therein comprises a plurality of dished interceptors 18 coated all over with a photoelectron emissive surface material as above described. Said interceptors may each be in the form of sheet-metal or hollow frusto-conical units all sloping uniformly in the same general direction and located in spaced nesting relation upon a common axis. Each successive interceptor has its smaller end even with or projecting slightly within the next preceding interceptor so that there will be no diametric line of passage for radiation to pass directly through the cathode. The only non-impinging path is one directly endwise of the cathode and anode, through the several holes in the interceptors wherein the anode is located, but this is of little or no consequence in practice since in use the tube is located in apparatus in such manner that the tube is addressed with its side toward the object of investigation, so the radiation approaches the cathode at an angle usually considerably less than 180° to the axis and more generally within the quadrant of 45° to 135°. No matter which side of the interceptor receives the radiation, there will be a substantially straight line path available to the released photoelectrons to travel to the anode. A voltage difference between the cathode and anode rendering the anode positive with respect to the cathode, creates the desired electric field between those electrodes for accelerating the photoelectrons to the anode. Depending upon such factors as character and pressure of gas in the tube, character of photoelectron emissive surface, and particular radiation to be detected, the voltage range should be between approximate limits of 200 to 2000 volts.

Any appropriate mechanical means may be employed for supporting and holding the interceptors in coaxial and spaced relation. As one example, I provide a rod 19 next the outer peripheries of the several interceptors, welded or otherwise secured to each, said rod extending parallel to the axis or longitudinally of the cathode and welded at its lower end to the lead-in support.

Fig. 3 shows an exemplification very similar to and including the features of the above-described cathode, the difference being that in this showing the interceptors are successive convolutions 18a of a dished spiral ribbon of metal, to constitute cathode 17a. The convolutions 18a have substantially the same spaced relation of semi-nesting character corresponding to the more simple interlap of the dished construction of frusto-conical interceptors. A rod 19 supports the several convolutions by being welded to the periphery of each, and constitutes an electrical as well as mechanical connection with the lead-in support 15.

In Fig. 4, longitudinal interceptors 18b are shown terminating at top and bottom at planes perpendicular to the axis and secured to rings 20 thereat common to the several interceptors. At least one of the bottom rings at the end of the cathode next the stem is secured to lead-in supports 15. As the several interceptors are welded or otherwise made integral with the rings, the cathode has adequate rigidity not to require the additional support rod 19 of Figs. 1 to 3. It is an advantage, and therefore illustrated, to spiral the interceptors longitudinally at least to the extent that the upper terminus end edge of one interceptor is rotationally advanced beyond the terminus end edge of its bottom, with said upper edge at least as far in advance rotationally as the angular spacing of that interceptor to the next adjacent one. Radiation along any usual angle of approach, such as the aforementioned quadrant of 45° to 135° to the axis, will consequently impinge upon some part of one of the spirally twisted interceptors. It is furthermore to be noted that in a direction diametric to the cathode or nearly so, even though a radiation may pass between two interceptors on the near side, the path is blocked by interposition of an interceptor at the far side. In a broader sense, referring to the radiation path as one parallel or nearly parallel to a line crossing an interceptor from outer to inner edges at the approach side of the radiation to the cathode, such that the radiation may pass between two interceptors thereat, there is an interceptor at the exit side completely across the path of the radiation, and in this broader statement is included the structures of all figures of the drawing.

I claim:

1. A radiation detector comprising an anode and a cathode adjacent thereto, said cathode providing a plurality of interlapping interceptors with passageways between adjacent interceptors from exterior to interior of the cathode, direct line paths through one part of the cathode being blocked by other parts of the interceptors, said interceptors viewed from the exterior of the cathode on lines radial to the anode having greater exposed area than interlapping area.

2. A radiation detector comprising an anode and a cathode, said cathode comprising a dished spiral ribbon having a surface emissive of photoelectrons from impingement of external radiation thereon, said surface being exposed toward the exterior for interception of radiation and providing a substantially direct-line path for photoelectrons released from said surface by the said radiation to travel to said anode, and said cathode having parts thereof interposed opposite direct-line passage of radiation through the side of the cathode exposed to said radiation.

CHARLES HERBERT GLEASON.

References Cited in the file of this patent

UNITED STATES PATENTS

| Number | Name | Date |
| --- | --- | --- |
| 2,397,072 | Hare | Mar. 19, 1946 |
| 2,440,511 | Hare | Apr. 27, 1948 |
| 2,599,352 | Schneider | June 3, 1952 |

OTHER REFERENCES

"Photoelectric Quantum Counters etc.," Locher, Physical Review, November 15, 1932, vol. 42, pp. 525–546.